US012606501B2

(12) United States Patent
Luo et al.

(10) Patent No.: US 12,606,501 B2
(45) Date of Patent: Apr. 21, 2026

(54) IGNITION POWDER, PREPARATION METHOD THEREFOR AND USE THEREOF, AND AIRBAG GAS GENERATOR

(71) Applicant: HUBEI HANGPENG CHEMICAL POWER TECHNOLOGY CO., LTD., Hubei (CN)

(72) Inventors: Yunqiang Luo, Hubei (CN); Xiangning Ren, Hubei (CN); Jun Zhang, Hubei (CN); Tao Du, Hubei (CN); Xiaochen Shen, Hubei (CN); Zhixiong Yang, Hubei (CN); Liu Liu, Hubei (CN); Wenbin Fu, Hubei (CN); Yinming Zhang, Hubei (CN)

(73) Assignee: HUBEI HANGPENG CHEMICAL POWER TECHNOLOGY CO., LTD., Xiangyang (CN)

( * ) Notice: Subject to any disclaimer, the term of this patent is extended or adjusted under 35 U.S.C. 154(b) by 1440 days.

(21) Appl. No.: 17/351,371

(22) Filed: Jun. 18, 2021

(65) Prior Publication Data

US 2022/0055966 A1 Feb. 24, 2022

Related U.S. Application Data

(63) Continuation-in-part of application No. PCT/CN2019/111405, filed on Oct. 16, 2019.

(30) Foreign Application Priority Data

May 30, 2019 (CN) .......................... 201910464200.5

(51) Int. Cl.
*C06B 33/14* (2006.01)
*B60R 21/264* (2006.01)
*C06B 21/00* (2006.01)

(52) U.S. Cl.
CPC .......... *C06B 33/14* (2013.01); *B60R 21/2644* (2013.01); *C06B 21/0008* (2013.01)

(58) Field of Classification Search
None
See application file for complete search history.

(56) References Cited

U.S. PATENT DOCUMENTS

| | | |
|---|---|---|
| 6,132,537 A | 10/2000 | Zeuner |
| 2002/0033211 A1 | 3/2002 | Zeuner |

(Continued)

FOREIGN PATENT DOCUMENTS

| | | |
|---|---|---|
| CN | 1644574 A | 7/2005 |
| CN | 1651360 A | 8/2005 |

(Continued)

OTHER PUBLICATIONS

Supplementary European Search Report EP 19 93 1228 mailing date of Jan. 10, 2022.

(Continued)

*Primary Examiner* — Aileen B Felton
(74) *Attorney, Agent, or Firm* — Fresh IP PLC; Clifford D. Hyra; Aubrey Y. Chen

(57) ABSTRACT

Disclosed are an ignition powder, a preparation method therefor and a use thereof, and an airbag gas generator, which belong to the technical field of ignition powders. The raw materials of the ignition powder include the following components in percentages by mass: potassium perchlorate. 30%~50%; basic copper nitrate: 5%~20%; a fuel: 15%~60%; a metal oxide: 1%~25%; and a metal powder: 1%~25%, wherein the metal powder is at least one of a titanium powder, a magnesium powder, a copper powder, an iron powder, a zirconium powder, a hafnium powder, a tungsten powder or a silicon powder.

18 Claims, 9 Drawing Sheets

(56) References Cited

U.S. PATENT DOCUMENTS

| | | | |
|---|---|---|---|
| 2013/0228254 A1 | | 9/2013 | Marlin et al. |
| 2017/0267601 A1* | | 9/2017 | Reimer ............... C06B 21/0025 |
| 2017/0334802 A1 | | 11/2017 | Rambow et al. |

FOREIGN PATENT DOCUMENTS

| | | | |
|---|---|---|---|
| CN | 1285547 C | | 11/2006 |
| CN | 1969167 A | | 5/2007 |
| CN | 101065340 A | | 10/2007 |
| CN | 101952227 A | | 1/2011 |
| CN | 105777458 A | | 7/2016 |
| CN | 108083959 A | | 5/2018 |
| CN | 108218648 A | | 6/2018 |
| CN | 108238836 A | | 7/2018 |
| CN | 109092175 A | | 12/2018 |
| CN | 110317120 A | | 10/2019 |
| EP | 2 407 443 A1 | | 1/2012 |
| JP | 20009143793 | * | 7/2009 |
| JP | 2012111682 | * | 6/2012 |
| JP | 2016216322 | * | 12/2016 |
| JP | 2018154539 A1 | | 10/2018 |
| WO | 2001034537 A1 | | 5/2001 |

OTHER PUBLICATIONS

Office Action issued by the European Patent and Registration Office, mailing date of Jan. 31, 2022, EP Application No. 19931228.1-1105.

Decision to Grant issued by the European Patent and Registration Office, mailing date of Mar. 28, 2022, EP Application No. 19931228. 1-1109.

Search Report for International Patent Application PCT/CN2019/ 111405, mailed Dec. 3, 2020.

First Office Action for Chinese Priority Application 201910464200. 5, mailed Feb. 3, 2020.

Search Report for Chinese Priority Patent Application 201910464200. 5.

Second Office Action for Chinese Priority Application 201910464200. 5, mailed Apr. 23, 2020.

Written Opinion of the International Searching Authority for International Patent Application PCT/CN2019/111405, mailed Dec. 3, 2020.

* cited by examiner

1

IGNITION POWDER, PREPARATION METHOD THEREFOR AND USE THEREOF, AND AIRBAG GAS GENERATOR

CROSS-REFERENCE TO RELATED APPLICATION

The present disclosure is a CIP application of PCT/CN2019/111405 application, which PCT application claims the priority to the Chinese patent application filed with the Chinese Patent Office on May 30, 2019 with the filing No. 201910464200.5, and entitled "Ignition Powder, Preparation Method therefor and Use thereof, and Airbag Gas Generator", all the contents of which are incorporated herein by reference in entirety.

TECHNICAL FIELD

The present disclosure relates to an ignition powder agent composition with reliable ignition performance and a preparation method therefor, in particular to an ignition powder with reliable ignition performance, good moisture absorption resistance, and capability of being efficiently produced, belonging to the technical field of ignition powders.

BACKGROUND ART

Ignition powders are an important type of initiating explosive material, and are commonly used to receive external stimulation to ignite other powders, such as propellant powders and propelling agents. The present disclosure relates to an ignition composition for a gas generator, for an airbag device in a motor vehicle. The performance of the ignition powder will directly affect the normal operation of a whole constraint system, therefore it occupies a quite important position in a charging system.

Currently, main types of ignition powders include black powder, 5AT-strontium nitrate type, B—KNO$_3$ ignition powder, Mg-PTFE ignition powder, and Al—KClO$_4$ ignition powder. Since the ignition powder needs to ignite a gas generating powder, a burning temperature, energy, and residue particles of the ignition powder have certain requirements, so that certain ignition reliability can be ensured. Black powder is a common ignition powder, and has the advantages of low price, relatively high flame sensitivity, and relatively high specific volume, but the energy thereof is too low, and the combustion product is mainly gas, with fewer residues, and it is difficult to ignite some insensitive fire powders or pyrotechnic agents. The black powder is suitable for application scenarios in which the ignition delay time is not required. The delay time is generally required to be less than 10 ms for the gas generator, so the black powder is rarely used as the ignition powder in the gas generator. Although the energy of the 5AT-strontium nitrate type ignition powder is improved, as 5AT-strontium nitrate is a temperature sensitive substance, the ignition delay problem easily occurs at low temperature of −35° C., furthermore, the performance of the generator at low temperature is quite different from the performance at high temperature and normal temperature. Using such type of ignition powder requires special design of the structure of the airbag gas generator (i.e. the gas generator of a safety airbag), and the ignition delay problem at low temperature is counteracted through improvement on the structure. Besides, the 5AT-strontium nitrate raw materials, as extremely hygroscopic materials, bring severe condition requirements to the manufacture, assembly, and storage, and even bring a certain risk to the use and storage process of the generator. The B/KNO$_3$ type ignition powder has the advantages of high energy, high burning temperature, and many residue particles, and is currently a widely used ignition powder on the airbag gas generator, but it is expensive, and meanwhile, the content of potassium nitrate in the formula generally may reach 70% or more, and a large amount of potassium oxide is discharged from the gas generator after burning, which easily causes harmful substances in the gas composition to exceed the standard. Such type of formula has quite high friction and impact sensitivity, is easy to explode, and has poor safety in the molding process. Meanwhile, due to the property of high hardness of boron, molding is quite difficult, the mold is severely worn, and the manufacturing cost is high.

The existing ignition powders, in particular the above ignition powders, are usually compressed and molded into small tablets in the manufacturing process, and some ignition powders further need to be smashed into particulate materials. These ignition powders, however, usually contain aluminum. In the above manufacturing process, the ignition powder formula containing aluminum powder has significantly higher sensitivity than that without aluminum powder, so that a certain safety risk exists in the granulation process. Besides, the aluminum-containing ignition powders further have other defects, for example, the cost of the aluminum powder is high; after the ignition powder is burned, there are more oxide residues of aluminum; and the solid content in the aluminum-containing ignition powder formula is also higher.

For example, the U.S. Pat. No. 6,487,974B1 mainly contains 5AT 26%, strontium nitrate 64%, aluminum powder 7%, and boron nitride 1%. Although this formula contains more strontium nitrate and 5AT, and the 5AT and strontium nitrate raw materials, as extremely hygroscopic materials, demand severe condition for manufacture, assembly, and storage thereof, and even bring a certain risk to the use and storage process of the generator; in addition, although addition of aluminum powder 7% is helpful for the low-temperature ignition performance, the aluminum powder is low in sensitivity, there is a certain risk in the process, especially in the tableting and granulating process.

U.S. Pat. No. 6,599,380 provides an ignition powder, which mainly contains guanidine nitrate 39%, potassium perchlorate 21%, copper oxide 30%, and aluminum 10%. Although this formula has a certain moisture absorption resistance, the burning rate 35% BPF of the formula is only 9.8 at 23° C.±2° C., and cannot meet higher burning rate requirements. This formula has many residues after burning, which increases the filtration cost, and besides, relatively large droplets are formed in the burning process of the aluminum powder and come out of the ignition hole to ablate a filtration screen, which is easy to cause injury to the air bag and personnel. The low explosion heat of this formula cannot satisfy the requirements of high heat of the ignition powder, and due to the presence of components such as aluminum powder and metal oxide, the ignition powder of this formula is prone to fire and explosion in the process of storage and transportation.

SUMMARY

The present disclosure provides an ignition powder, of which raw materials include the following components in percentages by mass:
    potassium perchlorate: 30%~50%;
    basic copper nitrate: 5%~20%;
    a fuel: 15%~60%;

a metal oxide: 1%~25%; and a metal powder: 1%~25%, wherein the metal powder is at least one selected from the group consisting of a titanium powder, a magnesium powder, a copper powder, an iron powder, a zirconium powder, a hafnium powder, a tungsten powder and a silicon powder.

In one or more embodiments, the raw materials of the ignition powder include the following components in percentages by mass:

potassium perchlorate: 30%~50%;

basic copper nitrate: 5%~20%;

a fuel: 30%~60%;

a metal oxide: 1%~15%; and a metal powder: 1%~15%, wherein the metal powder is at least one selected from the group consisting of a titanium powder, a magnesium powder, a copper powder, an iron powder, a zirconium powder, a hafnium powder, a tungsten powder and a silicon powder, and preferably is the titanium powder and the zirconium powder.

In one or more embodiments, the metal oxide is at least one selected from the group consisting of copper oxide, iron oxide and cobalt oxide.

In one or more embodiments, the fuel is at least one selected from the group consisting of guanidine nitrate, nitroguanidine, amidinoglycinamide, cyanoguanidine, aminoguanidine nitrate, diaminoguanidine nitrate, triaminoguanidine nitrate, aminonitroguanidine, and nitroguanidine.

In one or more embodiments, the ignition powder contains no aluminum.

In one or more embodiments, a mixture of various components is made into particles having a water content of less than 0.5%, before compression molding.

In one or more embodiments, the ignition powder is of a circular sheet structure, and the circular sheet structure has a diameter of 3~10 mm; the circular sheet structure has a thickness of 1-5 mm; and the circular sheet structure has a mass of 0.01~3 g.

In one or more embodiments, the ignition powder agent is of a granular structure, with a particle size of 8~20 meshes.

In one or more embodiments, the above ignition powder is prepared by way of wet granulation.

A preparation method for the ignition powder includes following steps:

(1). mixing potassium perchlorate, fuel, basic copper nitrate, and copper oxide in a predetermined ratio to obtain a first material, adding to the first material water with a mass of 3%~15% of a total mass of the first material, and mixing them to obtain a second material;

(2). making the second material pass through a 10~40 mesh screen, and collecting the screened material to obtain a third material;

(3). drying the third material until a moisture content thereof is less than 0.5% of a total mass of the third material, making the dried third material pass through the 10~40 mesh screen again, and collecting the screened material to obtain a fourth material; and (4). performing material compression molding on the fourth material.

In one or more embodiments, in the step (1), the potassium perchlorate, fuel, basic copper nitrate, copper oxide, and metal powder are put in a first container of a mixing system in a predetermined ratio, the mixing system further includes a second container and a mixing device, the mixing device is connected to the first container, the second container is in switchable communication with the first container, for storing water, and the first container is driven through the mixing device to vibrate to achieve mixing, thus obtaining the first material, and the second container is made to communicate with the first container, to add to the first material water with a mass of 3%~15% of the total mass of the first material for mixing to obtain the second material.

In one or more embodiments, the mixing system further includes an atomizer, and the atomizer has an input end in switchable communication with the second container, and an output end located in the first container, for adding water to the first material in a spraying manner.

In one or more embodiments, water is added to the first material through the atomizer in an intermittent spraying manner.

In one or more embodiments, the spraying time is 5~7 s, the intermittent time is 5~8 s, and the spraying rate is 3.5~5 ml/s.

In one or more embodiments, the mixing system further includes a static electricity discharging device configured to be connected with the first container and eliminate static electricity accumulated in the mixing process in real time.

In one or more embodiments, the mixing device is an acoustic wave mixing device.

In one or more embodiments, in step (1) the total mixing time is 4 min~15 min, and the mixing acceleration is 20~60 g, where g is gravitational acceleration.

In one or more embodiments, in the step (4), the fourth material is subjected to material molding by a molding method by a rotary tablet press machine.

In one or more embodiments, the circular sheet structure is obtained upon material molding in the step (4), and the circular sheet structure has a diameter of 3~10 mm; the circular sheet structure has a thickness of 1~5 mm; and the circular sheet structure has a mass of 0.01~3 g.

In one or more embodiments, the granular structure is obtained upon material molding in the step (4), and a particle size of the granular structure is 8~20 meshes; and the granular structure is obtained by granulating and then screening the sheet structure.

Use of the above ignition powder in a safety airbag gas generator of transportation means.

A safety airbag gas generator, wherein raw materials of an ignition powder used include the following components in percentages by mass:

potassium perchlorate: 30%~50%;

basic copper nitrate: 5%~20%;

a fuel: 30%~60%;

a metal oxide: 1%~15%; and a metal powder: 1%~15%, wherein the metal powder is at least one selected from the group consisting of a titanium powder, a magnesium powder, a copper powder, an iron powder, a zirconium powder, a hafnium powder, a tungsten powder and a silicon powder.

A safety airbag gas generator includes the ignition powder described herein.

BRIEF DESCRIPTION OF DRAWINGS

In order to more clearly illustrate technical solutions of embodiments of the present disclosure, accompanying drawings which need to be used in the embodiments will be introduced briefly below, and it should be understood that the accompanying drawings below merely show some embodiments of the present disclosure, and therefore should not be considered as limitation to the scope, and a person ordinarily skilled in the art still could obtain other relevant drawings according to these accompanying drawings, without using creative efforts.

DETAILED DESCRIPTION OF EMBODIMENTS

Figure 1:
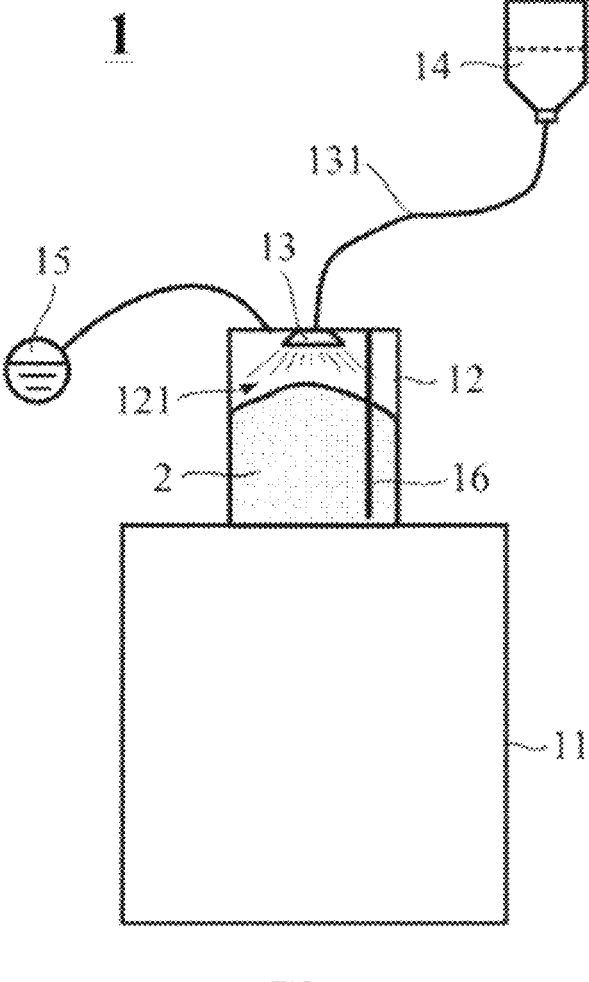
FIG. 1 is a schematic view of a mixing system provided in an example of the present disclosure.
Figure 2:
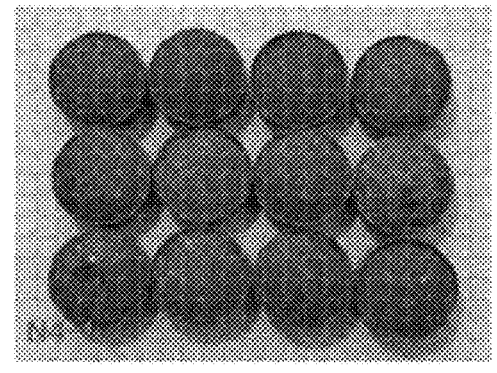
FIG. 2 is a diagram of tablets obtained by tableting an ignition powder agent in Example 1 of the present disclosure.

In order to make the objectives, technical solutions, and advantages of the embodiments of the present disclosure clearer, the technical solutions in the embodiments of the present disclosure will be described below clearly and completely. If no specific conditions are specified in the embodiments, they are carried out under normal conditions or conditions recommended by manufacturers. If manufacturers of reagents or apparatuses used are not specified, they are conventional products commercially available.

The problem solved by the present disclosure is to provide an ignition powder, a preparation method therefor and a use thereof, and a safety airbag gas generator to overcome the shortcomings in the prior art. The ignition powder further improves the moisture absorption resistance, has stable and reliable ignition performance without containing aluminum at the temperature of −40° C.~+90° C., even ignition when igniting a gas generating agent, better consistency, low sensitivity, capability of being ignited by an ordinary electric detonator, a burning rate 35% BPF of greater than 12, low friction sensitivity, reliable manufacturing process, and low condition requirements, and is suitable for mass production and preparation; in particular, as this formula contains no aluminum powder, the stability in the storage and preparation process is improved and combustion residues are avoided.

Below the present disclosure is further described in detail in combination with accompanying drawings and specific examples.

One or more embodiments of the present disclosure provide an ignition powder, of which raw materials include the following components in percentages by mass:

potassium perchlorate: 30%~50%;

basic copper nitrate: 5%~20%;

a fuel: 15%~60%;

a metal oxide: 1%~25%; and a metal powder: 1%~25%, wherein the metal powder is at least one selected from the group consisting of a titanium powder, a magnesium powder, a copper powder, an iron powder, a zirconium powder, a hafnium powder, a tungsten powder and a silicon powder.

One or more embodiments of the present disclosure provide an ignition powder, of which raw materials include the following components in percentages by mass:

potassium perchlorate: 30%~50%;

basic copper nitrate: 5%~20%;

a fuel: 30%~60%;

a metal oxide: 1%~15%; and a metal powder: 1%~15%, wherein the metal powder is at least one selected from the group consisting of a titanium powder, a magnesium powder, a copper powder, an iron powder, a zirconium powder, a hafnium powder, a tungsten powder and a silicon powder.

In one or more embodiments, the raw materials of the ignition powder include the following components in percentages by mass:

potassium perchlorate: 30%~50%;

basic copper nitrate: 5%~20%;

a fuel: 15%~30%;

a metal oxide: 15%~25%; and a metal powder: 15%~25%, wherein the metal powder is at least one selected from the group consisting of a titanium powder, a magnesium powder, a copper powder, an iron powder, a zirconium powder, a hafnium powder, a tungsten powder and a silicon powder.

In one or more embodiments, the percentage by mass of the potassium perchlorate is 30%~50%, for example, 31%, 32%, 33%, 34%, 35%, 36%, 37%, 38%, 39%, 40%, 41%, 42%, 43%, 44%, 45%, 46%, 47%, 48%, and 49%.

In one or more embodiments, the percentage by mass of the basic copper nitrate is 5%~20%, for example, 6%, 7%, 8%, 9%, 10%, 11%, 12%, 13%, 14%, 15%, 16%, 17%, 18%, and 19%.

In one or more embodiments, the percentage by mass of the fuel is 15-60%, for example, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, and 59%.

In one or more embodiments, the percentage by mass of the metal oxide is 1%~25%, for example, 2%, 3%, 4%, 5%, 6%, 7%, 8%, 9%, 10%, 11%, 12%, 13%, 14%, 15%, 16%, 17%, 18%, 19%, 20%, 21%, 22%, 23%, and 24%.

In one or more embodiments, the percentage by mass of the metal powder is 1%~25%, for example, 2%, 3%, 4%, 5%, 6%, 7%, 8%, 9%, 10%, 11%, 12%, 13%, 14%, 15%, 16%, 17%, 18%, 19%, 20%, 21%, 22%, 23%, and 24%.

In one or more embodiments, the ignition powder contains no aluminum. In one or more embodiments, the raw materials of the ignition powder contain no aluminum.

In the above formula of raw materials, the components in the following percentages by mass are adopted: potassium perchlorate 30%-40%, basic copper nitrate 5%~15%, fuel 30%~35%, copper oxide 10%~15%, and metal powder 8%~12%. The potassium perchlorate preferably has the purity of more than 99.2%, and the basic copper nitrate (BCN) preferably has a particle size D90 of not more than 5 μm, and D50 of 0.8~2 μm; the fuel is preferably at least one selected from the group consisting of guanidine nitrate, nitroguanidine, amidinoglycinamide, cyanoguanidine, aminoguanidine nitrate, diaminoguanidine nitrate, triaminoguanidine nitrate, aminonitroguanidine, and nitroguanidine, more preferably guanidine nitrate, of which the particle size D90 is preferably not more than 5 μm; and the particle size D90 of the metal oxide is preferably not more than 15 μm. The metal powder comprises preferably titanium powder and zirconium powder, of which the particle size D90 is preferably not more than 50 μm.

In one or more embodiments, the particle size D90 of the basic copper nitrate (BCN) is 1 μm, 2 μm, 3 μm, or 4 μm.

In one or more embodiments, the particle size D50 of the basic copper nitrate (BCN) is 0.9 μm, 1.0 μm, 1.1 μm, 1.2 μm, 1.3 μm, 1.4 μm, 1.5 μm, 1.6 μm, 1.7 μm, 1.8 μm, or 1.9 μm.

In one or more embodiments, the particle size D90 of the fuel, for example, guanidine nitrate, is 1 μm, 2 μm, 3 μm, or 4 μm.

In one or more embodiments, the particle size D90 of the metal oxide is 1 u m, 2 μm, 3 μm, 4 μm, 5μ, 6 μm, 7 μm, 8 μm, 9 μm, 10 μm, 11μ, 12μ m, 13 μm, or 14 μm.

In one or more embodiments, the particle size D90 of the metal powder is 5 μm, 10 μm, 15 μm, 20 μm, 25 μm, 30 μm, 35 μm, 40 μm, or 45 μm.

In one or more embodiments, the raw materials of the ignition powder include the following components in percentages by mass:

potassium perchlorate: 30%~40%;
basic copper nitrate: 5%~15%;
guanidine nitrate: 30%~35%;
copper oxide: 10%~15%; and
a titanium powder or a zirconium powder: 8%~12%.

A mixture of various components above is preferably made into particles having a water content of less than 0.5% before compression molding. In an optional example, the ignition powder is of a circular sheet structure, and the circular sheet structure has a diameter of 3~10 mm, for example, 3 mm, 4 mm, 5 mm, 6 mm, 7 mm, 8 mm, 9 mm, and 10 mm; the circular sheet structure has a thickness of 1~5 mm, for example, 1 mm, 2 mm, 3 mm, 4 mm, and 5 mm; and the circular sheet structure has a mass of 0.01~3 g, for example, 0.5 g, 1.0 g, 1.5 g, 2.0 g, and 2.5 g. In another optional example, the ignition powder agent is of a granular structure, with a particle size of 8~20 meshes. The granular structure is preferably adopted. In one or more embodiments, the particle size of the granular structure is 8 meshes, 9 meshes, 10 meshes, 11 meshes, 12 meshes, 13 meshes, 14 meshes, 15 meshes, 16 meshes, 17 meshes, 18 meshes, 19 meshes, or 20 meshes.

Optionally, the raw materials of the ignition powder may further include a functional auxiliary, such as fumed silica, boron nitride, talc, magnesium stearate, calcium stearate, and graphite, and the addition amount of the functional auxiliary is preferably 0.3~2% of a total mass of other raw materials, for example, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, and 1.9%.

One or more embodiment of the present disclosure further provide a method for preparing an ignition powder of the above formula by way of wet granulation, specifically including the following steps:

(1). mixing potassium perchlorate, a fuel, basic copper nitrate, a metal oxide, and a metal powder in a predetermined ratio to obtain a first material, adding to the first material water with a mass of 3%~15% of a total mass of the first material, and mixing them to obtain a second material;

(2). making the second material pass through a 10~40 mesh screen, and collecting the screened material to obtain a third material;

(3). drying the third material until a moisture content is less than 0.5% of a total mass of the third material, making the dried third material pass through the 10~40 mesh screen again, and collecting the screened material to obtain a fourth material; and (4). performing material compression molding on the fourth material.

As shown in FIG. 1, in the step (1), the potassium perchlorate, fuel, basic copper nitrate, metal oxide, and metal powder are put in a first container 12 of a mixing system in a predetermined ratio, the mixing system further includes a second container 14 and a mixing device 11, the mixing device 11 is connected to the first container 12, the second container 14 is in switchable communication with the first container 12, for storing water, and the first container 12 is driven through the mixing device 11 to vibrate to achieve mixing, thus obtaining the first material, and the second container 14 is made to communicate with the first container 12, to add to the first material water with a mass of 3%-15% of the total mass of the first material, for mixing to obtain the second material.

Further, as shown in FIG. 1, the mixing system further includes an atomizer 13, and the atomizer 13 has an input end in switchable communication with the second container 14 through a pipeline 131 having a switch valve, and an output end located in the first container 12, for adding water to the first material in a spraying 121 manner.

In an optional example, water is added to the first material through the atomizer in an intermittent spraying manner. In the above, the spraying time is preferably 5-7 s, the intermittent time is preferably 5-8 s, and the spraying rate is preferably 3.5-5 ml/s. When the above parameters are selected, it not only can ensure uniform mixing of various components, but also can avoid problems such as sticking to the wall of raw materials such as basic copper nitrate, guanidine nitrate, and metal powder due to inappropriate water content, thus ensuring the stability of the formula.

Further, the mixing system further includes a static electricity discharging device 15 configured to be connected with the first container 12 and eliminate static electricity accumulated in the mixing process in real time.

Specifically, the mixing device is an acoustic wave mixing device. The total mixing time in step (1) is preferably 8 min-20 min, and the mixing acceleration is preferably 18-40 g, where g is gravitational acceleration.

Specifically, in the step (4), the fourth material is subjected to material molding by a molding method by a rotary tablet press machine.

In an optional example, the circular sheet structure is obtained upon material molding in the step (4), and the circular sheet structure has a diameter of 3-10 mm; the circular sheet structure has a thickness of 1-5 mm; and the circular sheet structure has a mass of 0.01-3 g.

In another optional example, the granular structure is obtained upon material molding in the step (4), and a particle size of the granular structure is 8-20 meshes; and the granular structure is obtained by granulating and then screening the sheet structure.

Use of the above ignition powder in a safety airbag gas generator of transportation means.

One or more embodiments of the present disclosure further provide a safety airbag gas generator, wherein an ignition powder used is provided by the above ignition powder examples.

One or more embodiments of the present disclosure further provide a safety airbag gas generator, containing the ignition powder described herein.

Compared with the prior art, the present disclosure has the following beneficial effects (but not limited to the following):

(1). One or more embodiments of the present disclosure provide an ignition powder agent. By replacing the aluminum powder with the titanium powder, magnesium powder, copper powder, iron powder, zirconium powder, hafnium powder, tungsten powder or silicon powder, the problems of firing and explosion easily occurring in the mixing process of the aluminum powder with other metal oxides are avoided, and meanwhile, it is ensured that no relatively large droplets come out from the ignition hole to ablate the filter screen in the burning process. By adopting the basic copper nitrate and adjusting the contents of metal oxide and potassium perchlorate, synergistic effect of various components is achieved, improving the burning rate and the amount of produced gas of the ignition powder, and avoiding the ignition delay, especially the ignition delay at a low temperature of −40° C., and achieving 35% BPF of greater than 12 under the condition of a normal temperature of 23° C.±2° C., and meanwhile, the use amount of potassium perchlorate is reduced, which helps to reduce the production of toxic gas, and has better effect when used in the generator TANK-WASH.

(2). The burning temperature of the ignition powder provided in one or more embodiments of the present disclosure is 2500 k~3500 k, the gas production rate is 45%~65%, and the explosion heat is 3800 J/g~5000 J/g. This ignition powder is not easy to absorb moisture (the mass change thereof is not greater than 2.0% after exposure at a temperature of 18.4° C., and humidity of 72% for 172 hours), the manufacture, assembly, use, and storage process satisfy the use requirements of the generator, and it is a new ignition powder with good moisture absorption resistance.

(3). For the ignition powder provided in one or more embodiments of the present disclosure, by adopting the titanium powder or zirconium powder as an ignition improver and adjusting the use amount thereof, the phenomenon of ignition delay or large fluctuations when the ignition powder is at the low temperature of −40° C. is improved, thus ensuring a wider influence range of the ignition powder during operation at a temperature of −40° C.~+90° C.

(4). In the ignition powder provided in one or more embodiments of the present disclosure, the potassium perchlorate, basic copper nitrate, and guanidine nitrate are used in combination, wherein the potassium perchlorate and the basic copper nitrate are used as oxygen sources of the ignition powder agent formula, and the inventors determine, through many years of researches and tests, that the burning rate and flame temperature of the ignition powder agent are further improved when the potassium perchlorate, the basic copper nitrate, and guanidine nitrate are proportioned according to this formula.

(5) In the present disclosure, by optimizing the content ratio of various components of the ignition powder agent, and performing verification by a large number of tests, the ignition powder agent is enabled to have excellent performance and significant effect, and the ignition powder agent composition ignites more uniformly when igniting the gas generator, has better consistency, and has significantly improved ignition performance;

(6). Before molding of the ignition powder agent of the present disclosure, the mixing is performed by a one-pot dry-wet mixing mode. With use of a specific mixing system, two steps of dry mixing and wet mixing are completed in one container, thus avoiding transfer of the first material from a dry mixing process to a wet mixing process. Moreover, the mechanical action of blade on the material is eliminated by vibration mixing. This mixing method has the advantages such as dead-corner free mixing, short mixing time, good mixing uniformity, and high efficiency.

(7). The ignition powder agent provided in one or more embodiments of the present disclosure is used in the form of the granular structure, so as to provide the maximum available combustion surface area to obtain the fastest response, thereby quickly igniting the gas generator composition, and satisfying the requirements of the safety airbags to protect drivers and occupants.

(8) By adding water to the first container with the atomizer, the water can be continuously added without interrupting the mixing process, thus ensuring the continuity of the mixing process, and meanwhile, there is no need to adjust the mixing device and the first container, further improving the mixing efficiency.

The following are specific examples and comparative examples of the present disclosure, wherein the raw materials used are all commercially available products.

Comparative Example 1

Raw materials of an ignition powder agent include the following components in percentages by mass:
strontium nitrate 50%;
5-aminotetrazole (5-AT) 33%;
potassium nitrate 8%;
mica powder 8%; and
graphite 1%.

After being weighed, the above components were made into circular sheets having a diameter of 5.0 mm and a thickness of 2.2~3.7 mm by wet granulation and compression by a rotary tablet press machine. A specific preparation method comprised: mixing the strontium nitrate, 5-aminotetrazole (5-AT), potassium nitrate, mica powder, and graphite through the mixing system shown in FIG. 1 and then adding distilled water of 8% of a total mass of the raw materials, and mixing the resultant for 5 minutes to obtain a first material, wherein the water adding process was intermittent spraying addition, the spraying time was 3 s, the intermittent time was 3 s, and the spraying rate was 1.5 ml/s; making the first material pass through a 10-mesh screen to obtain a second material; drying the second material until the moisture content was less than 0.5% of the total mass of the second material, and making the dried second material pass through the 10-mesh screen again to obtain a third material; and performing material molding on the third material by the rotary tablet press machine to obtain the circular sheets having a diameter of 5.0 mm and a thickness of 3 mm.

Comparative Example 2

Raw materials of an ignition powder agent include the following components in percentages by mass:
boron powder 20%; and
potassium nitrate 80%.

The preparation method is the same as Comparative Example 1, and circular sheets having a diameter of 5.0 mm and a thickness of 3 mm were obtained.

Comparative Example 3

Raw materials of an ignition powder agent include the following components in percentages by mass:
NTO 35%;
strontium nitrate 50%;
aluminum powder 12%; and
mica powder 3%.

The preparation method is the same as Comparative Example 1, and circular sheets having a diameter of 5.0 mm and a thickness of 3 mm were obtained.

Comparative Example 4

Raw materials of an ignition powder agent include the following components in percentages by mass:
guanidine nitrate 39%;
potassium perchlorate 21%;
copper oxide 30%; and
aluminum powder 10%.

The preparation method is the same as Comparative Example 1, and circular sheets having a diameter of 5.0 mm and a thickness of 3 mm were obtained.

Example 1

Raw materials of an ignition powder agent include the following components in percentages by mass:
potassium perchlorate 30%;
guanidine nitrate 40%;
copper oxide 12%;
basic copper nitrate 10%; and
titanium powder 8%.

After being weighed, the above components were made into circular sheets having a diameter of 5.0 mm and a thickness of 2.2~3.7 mm by wet granulation and compression by a rotary tablet press machine. A specific preparation method comprised: mixing the potassium perchlorate, guanidine nitrate, copper oxide, basic copper nitrate, and titanium powder through the mixing system shown in FIG. 1 and then adding distilled water of 8% of a total mass of the raw materials, and mixing for 5 minutes to obtain a first material, wherein the water adding process was intermittent spraying addition, the spraying time was 3 s, the intermittent time was 3 s, and the spraying rate was 2 ml/s; making the first material pass through a 10-mesh screen to obtain a second material; drying the second material until the moisture content was less than 0.5% of the total mass of the second material, and making the dried second material pass through the 10-mesh screen again to obtain a third material; and performing material molding on the third material by the rotary tablet press machine.

Example 2

Raw materials of an ignition powder agent include the following components in percentages by mass:
potassium perchlorate 30%;
guanidine nitrate 40%;
copper oxide 12%;
basic copper nitrate 10%; and
zirconium powder 8%.

After being weighed, the above components were made into circular sheets having a diameter of 5.0 mm and a thickness of 2.2~3.7 mm by wet granulation and compression by a rotary tablet press machine. A specific preparation method comprised: mixing the potassium perchlorate, guanidine nitrate, copper oxide, basic copper nitrate, and titanium powder through the mixing system shown in FIG. 1 and then adding distilled water of 8% of a total mass of the raw materials, and mixing for 5 minutes to obtain a first material, wherein the water adding process was intermittent spraying addition, the spraying time was 3 s, the intermittent time was 3 s, and the spraying rate was 2 ml/s; making the first material pass through a 20-mesh screen to obtain a second material; drying the second material until the moisture content was less than 0.5% of the total mass of the second material, and making the dried second material pass through a 10-mesh screen again to obtain a third material; and performing material molding on the third material by the rotary tablet press machine.

Example 3

Raw materials of an ignition powder agent include the following components in percentages by mass:
potassium perchlorate 30%;
guanidine nitrate 40%;
copper oxide 12%;
basic copper nitrate 10%; and
magnesium powder 8%.

After being weighed, the above components were made into circular sheets having a diameter of 5.0 mm and a thickness of 2.2~3.7 mm by wet granulation and compression by a rotary tablet press machine. A specific preparation method comprised: mixing the potassium perchlorate, guanidine nitrate, copper oxide, basic copper nitrate, and magnesium powder through the mixing system shown in FIG. 1 and then adding distilled water of 8% of a total mass of the raw materials, and mixing for 5 minutes to obtain a first material, wherein the water adding process was intermittent spraying addition, the spraying time was 3 s, the intermittent time was 3 s, and the spraying rate was 2 ml/s; making the first material pass through a 10-mesh screen to obtain a second material; drying the second material until the moisture content was less than 0.5% of the total mass of the second material, and making the dried second material pass through a 20-mesh screen again to obtain a third material; and adding graphite with a mass of 0.5% of a total mass of the third material to the third material, and performing material molding by the rotary tablet press machine.

Example 4

Raw materials of an ignition powder agent include the following components in percentages by mass:
potassium perchlorate 30%;
guanidine nitrate 33%;
copper oxide 15%;
basic copper nitrate 10%; and
titanium powder 12%.

After being weighed, the above components were made into circular sheets having a diameter of 5.0 mm and a thickness of 2.2~3.7 mm by wet granulation and compression by a rotary tablet press machine. A specific preparation method comprised: mixing the potassium perchlorate, guanidine nitrate, copper oxide, basic copper nitrate, and magnesium powder through the mixing system shown in FIG. 1 and then adding distilled water of 8% of a total mass of the raw materials, and mixing for 5 minutes to obtain a first material, wherein the water adding process was intermittent spraying addition, the spraying time was 3 s, the intermittent time was 3 s, and the spraying rate was 1.5-3 ml/s; making the first material pass through a 10-mesh screen to obtain a second material; drying the second material until the moisture content was less than 0.5% of the total mass of the second material, and making the dried second material pass through the 10-mesh screen again to obtain a third material; and performing material molding on the third material by the rotary tablet press machine.

Example 5

Figure 3:
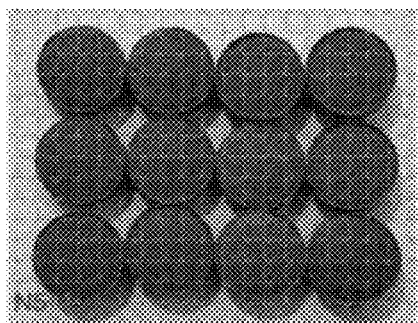
FIG. 3 is a diagram of tablets obtained by tableting the ignition powder agent in Example 5 of the present disclosure.
Figure 4:
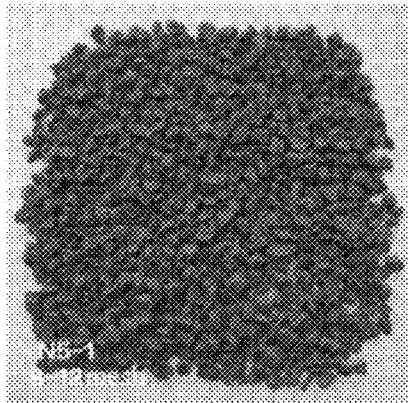
FIG. 4 is a diagram of a granular structure obtained after the tablets of the ignition powder agent in Example 5 of the present disclosure are granulated.
Figure 5:
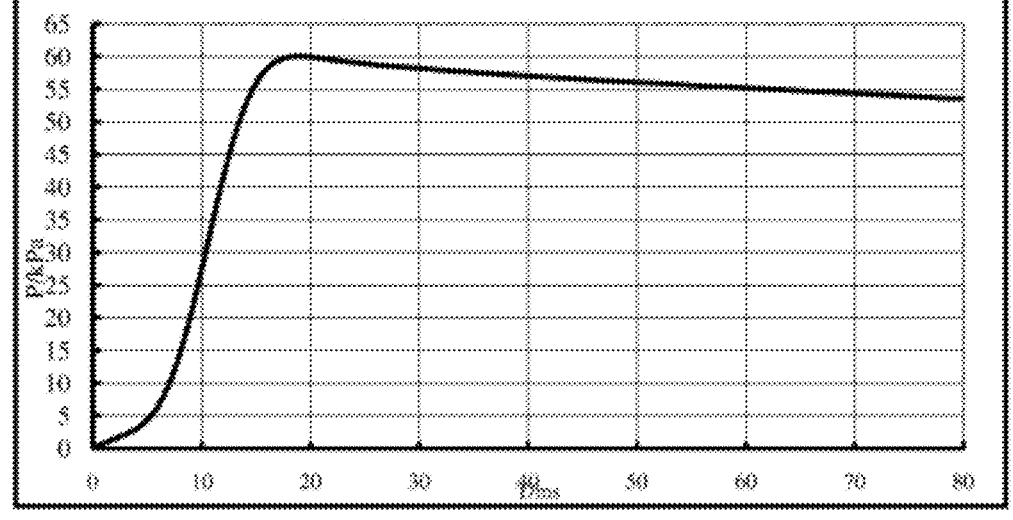
FIG. 5 is a CCC graph of the ignition powder agent in Comparative Example 1 of the present disclosure.
Figure 6:
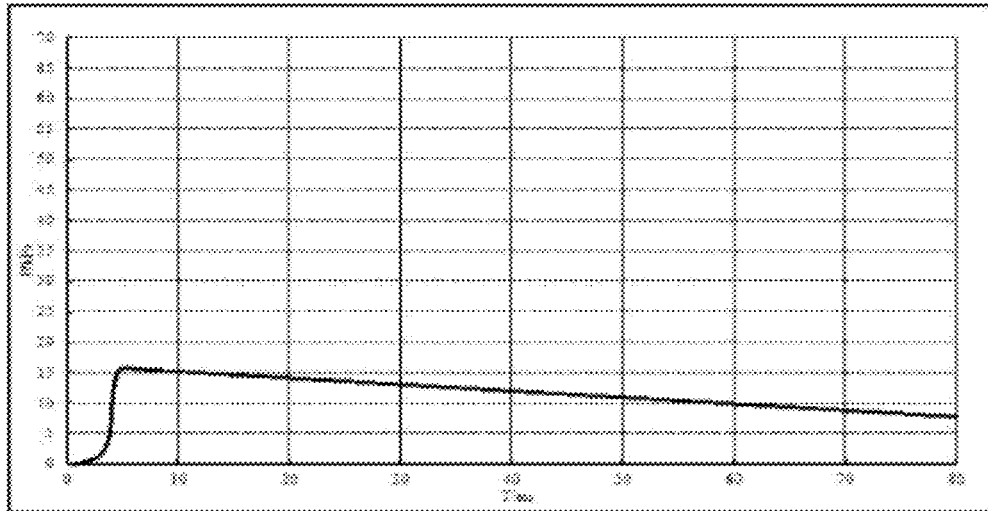
FIG. 6 is a CCC graph of the ignition powder agent in Comparative Example 2 of the present disclosure.
Figure 7:
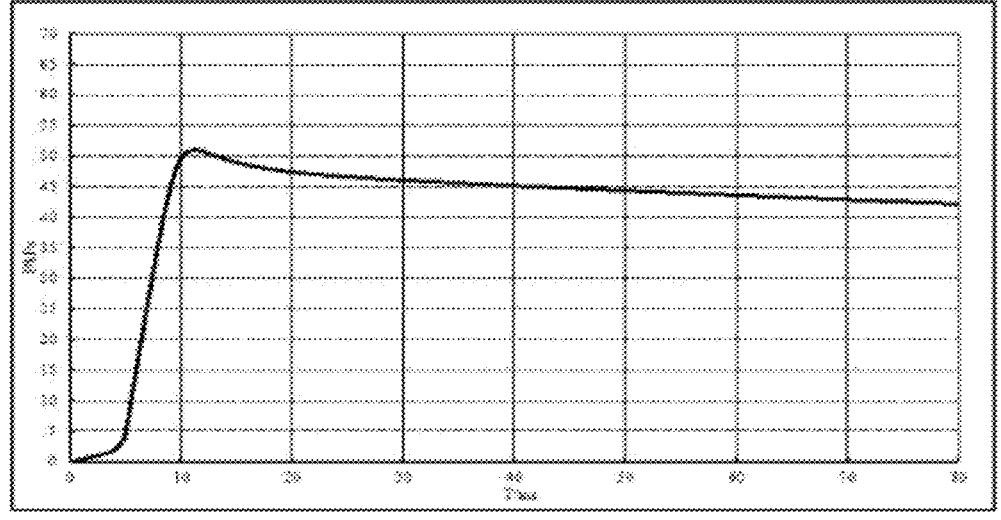
FIG. 7 is a CCC graph of the ignition powder agent in Comparative Example 3 of the present disclosure.
Figure 8:
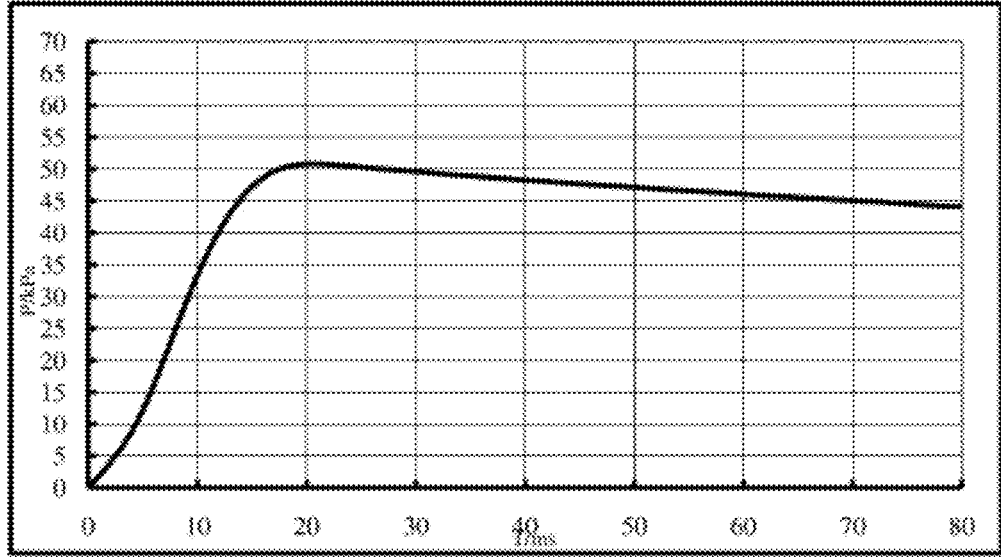
FIG. 8 is a CCC graph of the ignition powder agent in Comparative Example 4 of the present disclosure.
Figure 9:
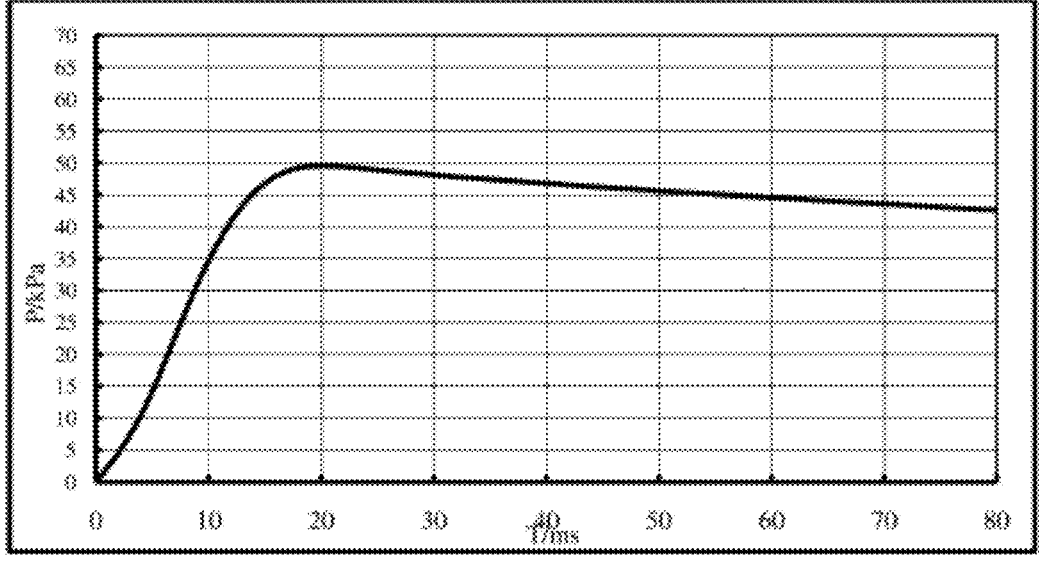
FIG. 9 is a CCC graph of the ignition powder agent in Example 1 of the present disclosure.
Figure 10:
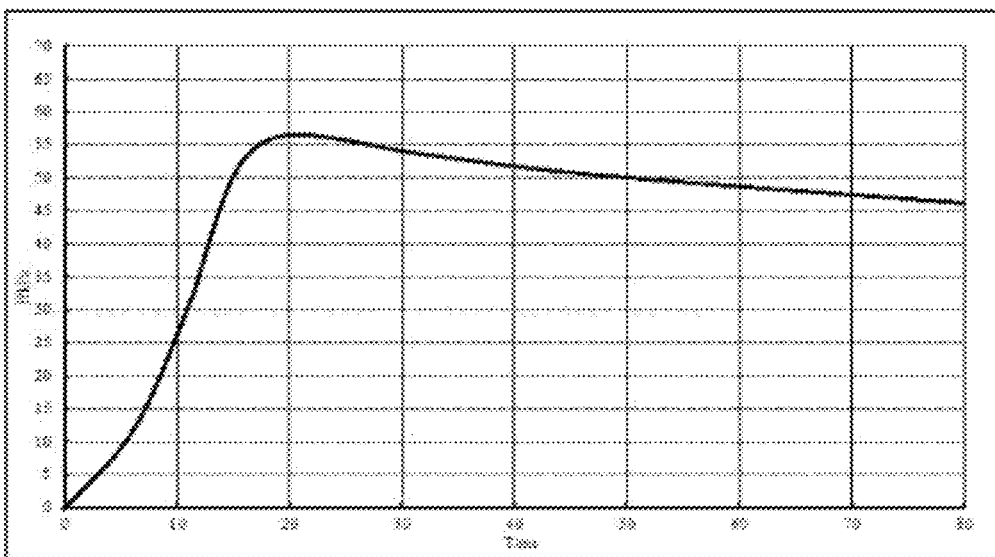
FIG. 10 is a CCC graph of the ignition powder agent in Example 2 of the present disclosure.
Figure 11:
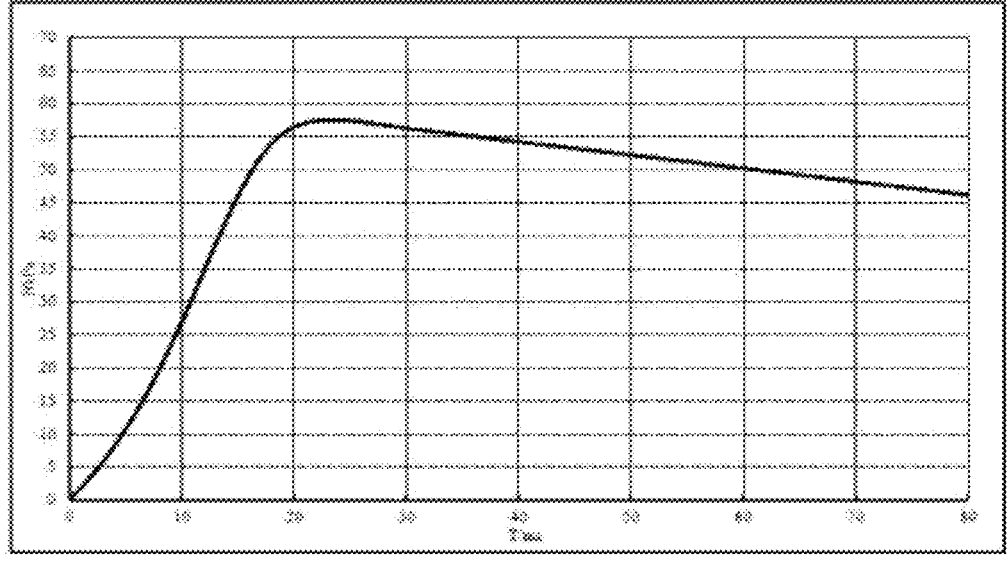
FIG. 11 is a CCC graph of the ignition powder agent in Example 3 of the present disclosure.
Figure 12:
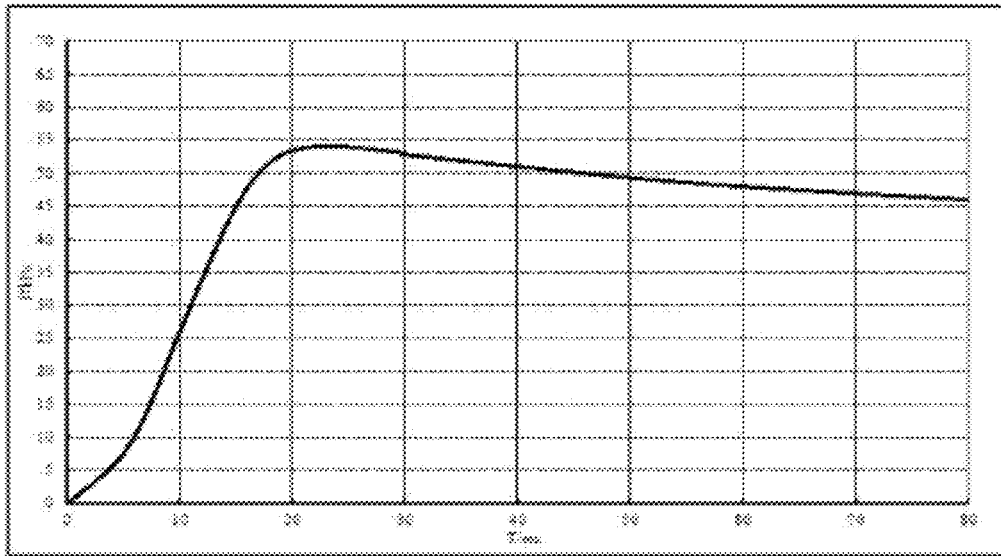
FIG. 12 is a CCC graph of the ignition powder agent in Example 4 of the present disclosure.
Figure 13:
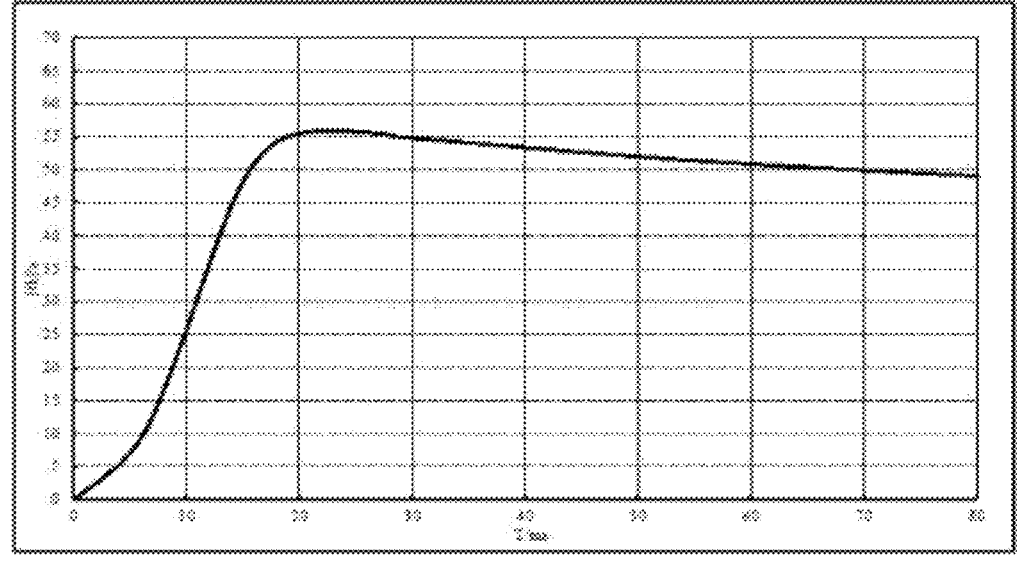
FIG. 13 is a CCC graph of the ignition powder agent in Example 5 of the present disclosure.
Figure 14:
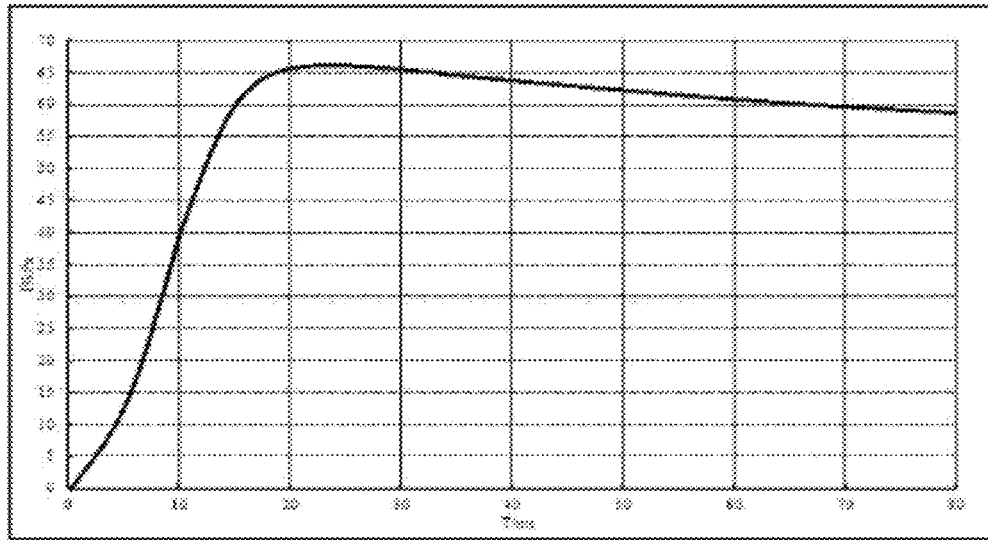
FIG. 14 is a CCC graph of the ignition powder agent in Example 6 of the present disclosure.
Figure 15:
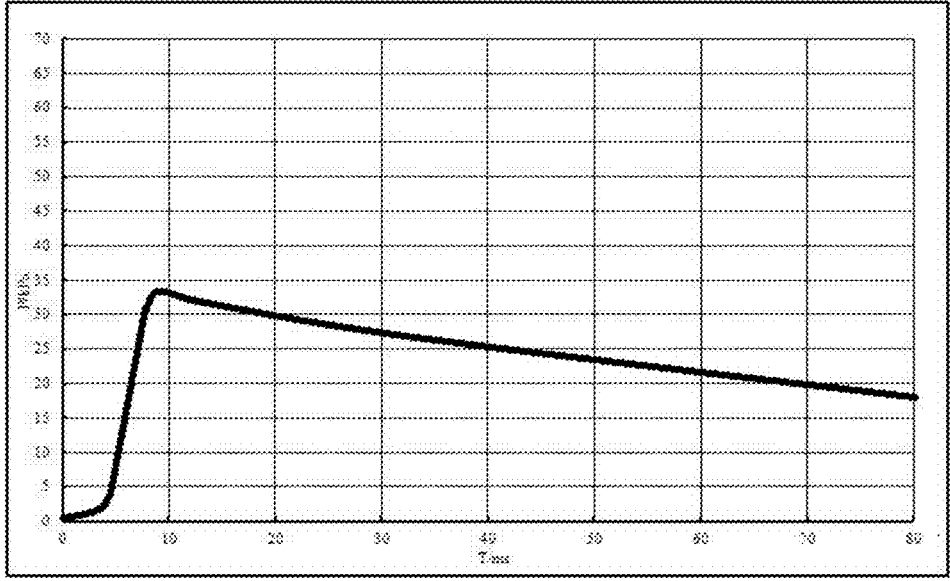
FIG. 15 is a CCC graph of the ignition powder agent in Example 7 of the present disclosure.
Figure 16:
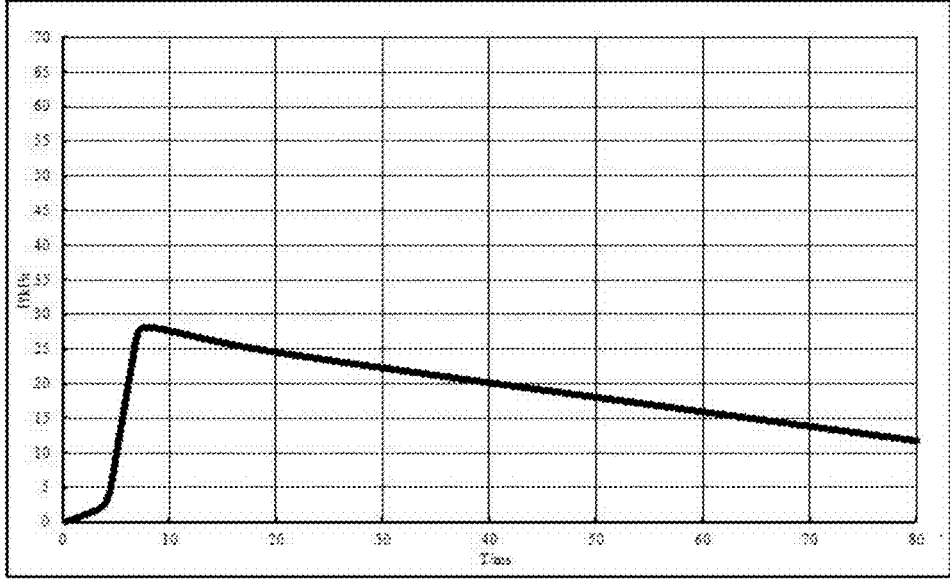
FIG. 16 is a CCC graph of the ignition powder agent in Example 8 of the present disclosure.
Figure 17:
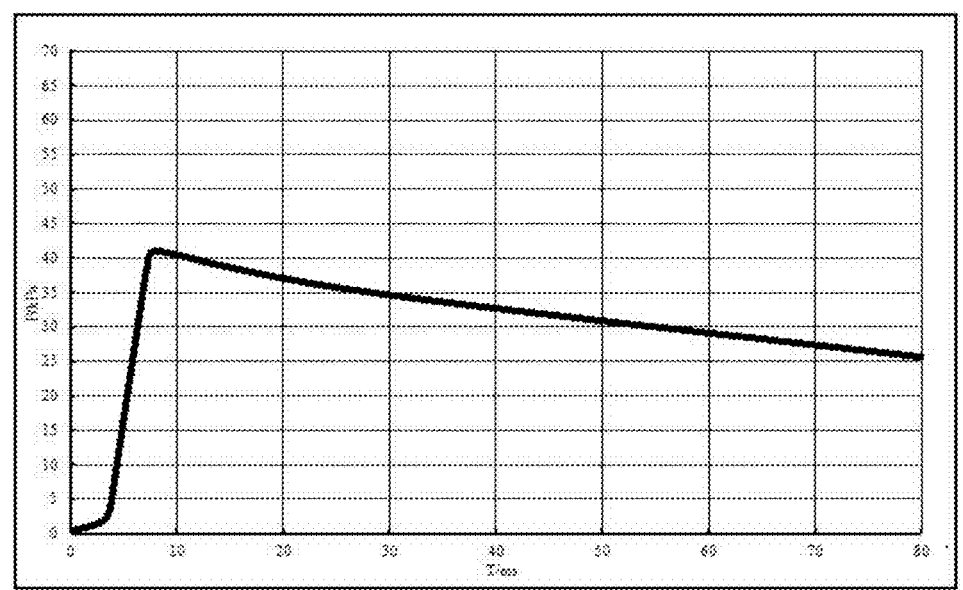
FIG. 17 is a CCC graph of the ignition powder agent in Example 9 of the present disclosure.

Raw materials of an ignition powder agent include the following components in percentages by mass:
    potassium perchlorate 40%;
    guanidine nitrate 30%;
    iron oxide 12%;
    basic copper nitrate 8%; and
    magnesium powder 10%.
    After being weighed, the above components were made into particles of 8~12 meshes by wet granulation and compression by a rotary tablet press machine. A specific preparation method comprised: mixing the potassium perchlorate, guanidine nitrate, iron oxide, basic copper nitrate, and titanium powder through the mixing system shown in FIG. 1 and then adding distilled water of 8% of a total mass of the raw materials, and mixing for 5 minutes to obtain a first material, wherein the water adding process was intermittent spraying addition, the spraying time was 3 s, the intermittent time was 3 s, and the spraying rate was 1.5-3 ml/s; making the first material pass through a 20-mesh screen to obtain a second material; drying the second material until the moisture content was less than 0.5% of the total mass of the second material, and making the dried second material pass through the 20-mesh screen again to obtain a third material; and compressing the third material into circular sheets having a diameter of 5.0 mm and a thickness of 2.2~3.7 mm (as shown in FIG. 3) by the rotary tablet press machine, then granulating the circular sheets by a granulating machine, and selecting the particles of 8~12 meshes (as shown in FIG. 4).

Example 6

Raw materials of an ignition powder agent include the following components in percentages by mass:
    potassium perchlorate 35%;
    guanidine nitrate 45%;
    copper oxide 9%;
    basic copper nitrate 1%; and
    titanium powder 10%.
    After being weighed, the above components were made into circular sheets having a diameter of 5.0 mm and a thickness of 3 mm by wet granulation and compression by a rotary tablet press machine. A specific preparation method is the same as that in Example 1, and the only difference is that the raw material ratio is different.

Example 7

Raw materials of an ignition powder agent include the following components in percentages by mass:
    potassium perchlorate 34%;
    guanidine nitrate 20%;
    copper oxide 20%;
    basic copper nitrate 10%; and
    titanium powder 16%.
    After being weighed, the above components were made into circular sheets having a diameter of 3.0 mm and a thickness of 1.5 mm by wet granulation and compression by a rotary tablet press machine. A specific preparation method is the same as that in Example 1, and the only difference is that the raw material ratio is different.

Example 8

Raw materials of an ignition powder agent include the following components in percentages by mass:
    potassium perchlorate 40%;
    guanidine nitrate 15%;
    copper oxide 20%;
    basic copper nitrate 10%; and
    titanium powder 15%.
    After being weighed, the above components were made into circular sheets having a diameter of 3.0 mm and a thickness of 1.5 mm by wet granulation and compression by a rotary tablet press machine. A specific preparation method is the same as that in Example 1, and the only difference is that the raw material ratio is different.

Example 9

Raw materials of an ignition powder agent include the following components in percentages by mass:
    potassium perchlorate 32%;
    guanidine nitrate 25%;
    copper oxide 10%;
    basic copper nitrate 8%; and
    titanium powder 25%.
    After being weighed, the above components were made into circular sheets having a diameter of 3.0 mm and a thickness of 1.5 mm by wet granulation and compression by a rotary tablet press machine. A specific preparation method is the same as that in Example 1, and the only difference is that ratios of the raw material ratio are different.
    Performance test results of the ignition powders prepared in Comparative Example 1~Comparative Example 4 and Example 1-Example 6 are as shown in Table 1 to Table 5 and FIG. 5 to FIG. 14:
    (1) Explosion Heat Test of Ignition Powders
        Test instrument: vacuum bomb precision temperature-regulating type automatic calorimeter RF-C7000 (TJ) Z.
        Test conditions: in a vacuum state, a sample amount of 4 g/time, and test twice in parallel.
        Test standard: according to ministerial standard QJ 1359-88 "Constant Temperature Method for Testing Explosion Heat of Composite Solid Propellant" of Ministry of Space Industry of People's Republic of China.
    (2) DSC-TG Characterization of Ignition Powders
        Test instrument: Netzsch STA449F3 ultra-high temperature synchronous thermal analyzer, Germany
        Reference standard: institute standard No. Q/G 4A-2002 "Method for Testing Thermal Decomposition Temperature of Composite Solid Propellant" of the Fourth Institute of China Aerospace Science and Technology Corporation Test conditions: temperature range: −150° C.~+700° C.; temperature raising rate 10° C./min, $N_2$ atmosphere, and $N_2$ flow rate of 60 ml/min; testing a starting decomposition temperature and an exothermic decomposition peak temperature of the ignition powders at a temperature raising rate of 10° C./min.

(3) High-Temperature Long-Term Storage Stability Test of the Ignition Powders

Reference standard: USCAR

Test method: placing the ignition powders at a temperature of 107° C. for 408 h in total, measuring DSC-TG and weight of the powders before and after the experiment, and analyzing the DSC-TG and weight loss of the powders after long-time high-temperature aging to evaluate the long term thermal storage stability of the powders.

(4) CCC (Closed Combustion Chamber) Performance Test of the Ignition Powders

Reference standard: "CCC Performance Test Standard"

Test method: using a 30 mL airtight tank, 2 g of the ignition powder, and an AQ-3 electric detonator, maintaining the temperature at a room temperature of 23° C. for more than 1 hour, a 200 MPa sensor, and an HUDE test system for testing performance thereof.

(5) Moisture Absorption Performance Test of the Ignition Powders

Reference standard: "Moisture Absorption Assay GJB8683.7-2015"

Test method: the formulas in the comparative examples and examples in the present patent were weighed at a temperature of 18.4° C. and humidity of 72%, the mass change thereof was weighed after 172 hours of exposure, and the moisture absorption was tested and compared, as shown in Table 5.

TABLE 1

Table of Physical and Chemical Performances of Ignition Powders Provided in Various Comparative Examples

| Comparative Examples | Burning temperature (K) | Explosion heat (J/g) | Amount of produced gas (mass %) | Friction sensitivity |
|---|---|---|---|---|
| 1 | 3036 | 4845 | 47.2 | 52% |
| 2 | 3297 | 7048 | 1.8 | 100% |
| 3 | 3022 | 3998 | 46.1 | 100% |
| 4 | 3065 | 4020 | 45.7 | 52% |

TABLE 2

Table of Physical and Chemical Performances of Ignition Powders Provided in Various Examples of the Present Disclosure

| Examples | Burning temperature (K) | Explosion heat (J/g) | Amount of produced gas (mass %) | Friction sensitivity |
|---|---|---|---|---|
| 1 | 2489 | 4832 | 54.7 | 0% |
| 2 | 2200 | 4576 | 55.5 | 0% |
| 3 | 2724 | 4602 | 52.7 | 0% |
| 4 | 2752 | 4925 | 53.88 | 0% |
| 5 | 2838 | 4576 | 47.6 | 0% |
| 6 | 2565 | 4452 | 55.2 | 0% |
| 7 | 3061 | 5237 | 28.1 | 4% |
| 8 | 2818 | 5082 | 22.0 | 4% |
| 9 | 3583 | 5642 | 30.8 | 8% |

TABLE 3

Table of Aging Performance of Ignition Powders Provided in Various Comparative Examples and Various Examples

| Ignition Powder | Before aging | | | After aging | | |
|---|---|---|---|---|---|---|
| | starting decomposition temperature ° C. | exothermic decomposition peak temperature ° C. | thermal weight loss Wt % | starting decomposition temperature ° C. | exothermic decomposition peak temperature ° C. | thermal weight loss Wt % |
| Comparative Example 1 | 168.2 | 241.4 | 2.41 | 175.5 | 252.7 | 5.78 |
| Comparative Example 2 | 531.2 | 547.4 | 3.52 | 535.5 | 550.7 | 5.25 |
| Comparative Example 4 | 170.5 | 231.2 | 1.50 | 175.6 | 239.8 | 2.30 |
| Example 1 | 184.0 | 242.1 | 1.30 | 183.2 | 240.1 | 1.20 |
| Example 2 | 187.5 | 250.3 | 1.0 | 185.3 | 250.3 | 0.09 |
| Example 3 | 190.4 | 255.1 | 0.98 | 189.6 | 249.2 | 0.08 |
| Example 4 | 182.8 | 236.5 | 0.12 | 182.1 | 236.3 | 0.05 |
| Example 5 | 185.7 | 235.4 | 0.45 | 185.9 | 236.5 | 0.09 |
| Example 6 | 189.9 | 240.2 | 0.78 | 190.2 | 242.3 | 0.08 |
| Example 7 | 193.5 | 233.1 | 0.15 | 191.0 | 231.55 | 0.06 |
| Example 8 | 190.2 | 231.1 | 0.13 | 189.1 | 230.4 | 0.07 |
| Example 9 | 189.8 | 234.3 | 0.26 | 190.7 | 236.4 | 0.08 |

TABLE 4

Table of CCC Performance of Ignition
Powders Provided in Various Comparative
Examples and Various Examples

| Ignition Powder | Pmax, MPa | 35% BPF |
|---|---|---|
| Comparative Example 1 | 61 | 12.3 |
| Comparative Example 2 | 16 | 26.3 |
| Comparative Example 3 | 51 | 15.8 |
| Comparative Example 4 | 54 | 9.8 |
| Example 1 | 50 | 13.7 |
| Example 2 | 52 | 13.6 |
| Example 3 | 51 | 13.8 |
| Example 4 | 54 | 13.9 |
| Example 5 | 56 | 14.5 |
| Example 6 | 68 | 13.1 |
| Example 7 | 34 | 17.3 |
| Example 8 | 28 | 17.6 |
| Example 9 | 42 | 18.4 |

TABLE 5

Comparison Table of Moisture Absorption Test of Various
Comparative Examples and Various Examples

| | Exposure time | Initial weight, g | Weight after moisture absorption, g | Weight increased, g | Proportion increased, g | Environment temperature and humidity |
|---|---|---|---|---|---|---|
| Comparative Example 1 | 172 h | 30.0152 | 35.3215 | 5.3063 | 17.68% | Temperature: 18.4° C. |
| Comparative Example 2 | | 30.0023 | 31.3214 | 1.3191 | 4.40% | Humidity: 72% |
| Comparative Example 3 | | 30.0028 | 33.2516 | 3.2488 | 10.83% | |
| Comparative Example 4 | | 30.0016 | 30.5597 | 0.5581 | 1.86% | |
| Example 1 | | 30.0052 | 30.2519 | 0.2467 | 0.82% | |
| Example 2 | | 30.0104 | 30.3354 | 0.325 | 1.08% | |
| Example 3 | | 30.0084 | 30.3654 | 0.357 | 1.19% | |
| Example 4 | | 30.0018 | 30.189 | 0.1872 | 0.62% | |
| Example 5 | | 30.0034 | 30.4216 | 0.4182 | 1.39% | |
| Example 6 | | 30.0058 | 30.4614 | 0.4556 | 1.52% | |
| Example 7 | | 30.0024 | 30.2463 | 0.2439 | 0.81% | |
| Example 8 | | 30.0051 | 30.146 | 0.1409 | 0.47% | |
| Example 9 | | 30.0032 | 30.257 | 0.2538 | 0.84% | |

It may be seen that the ignition powder in the examples of the present disclosure, without containing aluminum, can reach or be better than the corresponding performances of the ignition powder in the comparative examples in physical and chemical performances, aging performance of ignition powder, CCC performance of ignition powder, and moisture absorption.

The above-mentioned are merely for the best specific implementations of the present disclosure, while the scope of protection of the present disclosure is not limited thereto. Any variations or substitutions, readily occurring to any skilled person familiar with the present technical field, should be covered within the scope of protection of the present disclosure.

The content that is not described in detail in the description of the present disclosure belongs to the well-known technology of those skilled in the art.

What is claimed is:

1. An ignition powder comprising:
36% to 50% by mass of potassium perchlorate;
5% to 20% by mass of basic copper nitrate;
30% to 35% by mass of guanidine nitrate;

11% to 25% by mass of copper oxide; and
11% to 24% by mass of a titanium powder or a zirconium powder.

2. The ignition powder according to claim 1,
wherein the potassium perchlorate is 36% to 40% by mass;
wherein the basic copper nitrate is 5% to 15% by mass;
wherein the guanidine nitrate is 30% to 35% by mass;
wherein the copper oxide is 11% to 15% by mass; and
wherein the titanium powder or zirconium powder is 11% to 12% by mass.

3. The ignition powder according to claim 1, wherein the fuel is selected from the group consisting of: guanidine nitrate, nitroguanidine, amidinoglycinamide, cyanoguanidine, aminoguanidine nitrate, diaminoguanidine nitrate, triaminoguanidine nitrate, aminonitroguanidine, nitroguanidine, and combinations thereof.

4. The ignition powder according to claim 1, wherein the metal oxide is selected from the group consisting of: copper oxide, iron oxide, cobalt oxide, and combinations thereof.

5. The ignition powder according to claim 1, wherein the ignition powder contains no aluminum.

6. The ignition powder according to claim 1, wherein the ignition powder is of a circular sheet structure, and the circular sheet structure has a diameter of 3 to 10 mm, a thickness of 1 to 5 mm, and a mass of 0.01 to 3 g; or
the ignition powder is of a granular structure, with a particle size of 8 to 20 meshes.

7. A preparation method for the ignition powder according to claim 1, the method comprising:
preparing the ignition powder by way of wet granulation.

8. The preparation method according to claim 7, wherein the preparing step further comprises:
mixing potassium perchlorate, a fuel, basic copper nitrate, a metal oxide, and a metal powder in a predetermined ratio to obtain a first material;
adding, to the first material, water with a mass of 3% to 15% of a total mass of the first material, and mixing to obtain a second material;

making the second material pass through a 10 to 40 mesh screen;

collecting the screened material to obtain a third material;

drying the third material until a moisture content is less than 0.5% of a total mass of the third material;

passing the dried third material through the 10 to 40 mesh screen;

collecting the screened material to obtain a fourth material; and performing material compression molding on the fourth material.

9. The preparation method according to claim 8, wherein the potassium perchlorate, the fuel, the basic copper nitrate, the metal oxide, and the metal powder are put in a first container of a mixing system, the mixing system further comprising a second container and a mixing device, the mixing device being connected to the first container, the second container storing water and being in switchable communication with the first container, the first container being driven through the mixing device to vibrate to achieve the mixing, and the second container being switched to communicate with the first container to achieve the adding.

10. The preparation method according to claim 9, wherein the mixing system further comprises an atomizer, and the atomizer has an input end in switchable communication with the second container, and an output end located in the first container for the adding of the water to the first material in a spraying manner.

11. The preparation method according to claim 10, wherein the spraying manner is intermittent.

12. The preparation method according to claim 11, wherein a total spraying time is 5 to 7 seconds, the intermittent time is 5 to 8 seconds, and a spraying rate is 3.5 to 5 ml per second.

13. The preparation method according to claim 9, wherein the mixing system further comprises a static electricity discharging device configured to be connected with the first container and eliminate static electricity accumulated in the mixing process in real time.

14. The preparation method according to claim 9, wherein the mixing device is an acoustic wave mixing device.

15. The preparation method according to claim 14, wherein the mixing takes between 4 minutes and 15 minutes, and a mixing acceleration is 20 to 60 g, where g represents gravitational acceleration.

16. The preparation method according to claim 8, wherein, in the performing step, the fourth material is subjected to material molding using a rotary tablet press machine.

17. The preparation method according to claim 8, wherein a circular sheet structure is obtained after the performing step, and the circular sheet structure has a diameter of 3 to 10 mm, a thickness of 1 to 5 mm, and a mass of 0.01 to 3 g; or wherein a granular structure is obtained after the performing step by granulating and then screening the circular sheet structure, and a particle size of the granular structure is 8 to 20 meshes.

18. A safety airbag gas generator, comprising the ignition powder according to claim 1.

* * * * *